United States Patent Office 3,506,702
Patented Apr. 14, 1970

3,506,702
2-CYANOALKYL URETHANES
Laszlo Suranyi, Mannhein, Germany, assignor to Knoll A.G., Ludwigshafen (Rhine), Germany
No Drawing. Filed Dec. 27, 1966, Ser. No. 604,638
Claims priority, application Germany, Jan. 3, 1966, K 58,055
Int. Cl. C07c *125/04, 121/50, 121/14*
U.S. Cl. 260—465                          7 Claims

ABSTRACT OF THE DISCLOSURE

Urethanes having utility as muscle-relaxants, anti-spasmodics, tranquilizers and sedatives and having the formula

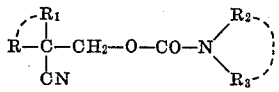

in which R is a straight or branched chain alkyl of 1 to 6 carbon atoms; $R_1$ is a straight or branched chain alkyl of 1 to 6 carbon atoms, phenyl, or phenyl mono- or disubstituted by halogen, trifluoromethyl, nitro, alkyl of 1 to 3 carbon atoms or alkoxy of 1 to 3 carbon atoms; R and $R_1$ together are divalent alkylene of 3 to 5 carbon atoms; $R_2$ and $R_3$ are hydrogen, lower alkyl, lower alkoxy or benzyl; and $R_2$ and $R_3$ together with the nitrogen stand for a six-membered heterocyclic ring, as well as the preparation and administration thereof.

---

This invention relates to novel urethanes of the formula

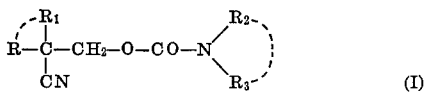 (I)

in which R is a straight or branched chain alkyl of 1 to 6 carbon atoms; $R_1$ is a straight or branched chain alkyl of 1 to 6 carbon atoms, phenyl, or phenyl mono- or disubstituted by halogen, trifluoromethyl, nitro, alkyl of 1 to 3 carbon atoms or alkoxy of 1 to 3 carbon atoms; R and $R_1$ together are divalent alkylene of 3 to 5 carbon atoms; $R_2$ and $R_3$ are hydrogen, lower alkyl, lower alkoxy or benzyl; and $R_2$ and $R_3$ together with the nitrogen stand for a six-membered heterocyclic ring, and to a method for preparing and administering such urethanes.

The compounds of the invention are obtainable by reacting α,α-disubstituted β-hydroxypropionitriles of the formula

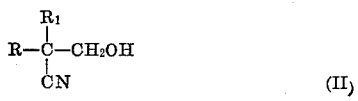 (II)

with:

(A) Cabamic acid esters of low molecular weight aliphatic alcohols in the presence of reesterification catalysts such as aluminum isopropylate, sodium alcoholate and magnesium alcoholate;

(B) Chloroformic acid esters followed by reaction of the resulting product with an amine of the formula

 (III)

or (C) Phosgene and reacting the resulting chloroformic acid ester with an amine of Formula III.

Chloroformic acid phenyl esters are preferred as reactants in embodiment B. Reaction of the chloroformic acid esters with the propionitriles of Formula II is advantageously carried out in the presence of pyridine or other tertiary base. Also in the subsequent reaction of the neutral carbonic acid ester formed in the first step with amines of Formula II, the presence of basic condensation agents such as tertiary bases or the use of an excess of the amine component is recommended.

In embodiment C, phosgene is led into a propionitrile of Formula II at ambient temperature or moderately elevated temperature. The propionitrile can be used as such or in an aromatic hydrocarbon solvent such as toluene, benzene or xylene. The subsequent reaction of the resulting chloroformic acid ester with an amine of Formula III takes place under the same conditions as in embodiment B of the process.

The starting materials represented by Formula II are obtainable by condensation of the corresponding substituted phenylacetonitriles with formaldehyde in the presence of strongly basic condensing agents such as benzyl-trimethyl-ammonium hydroxide in solvents such as pyridine. They are also obtainable by reduction of the corresponding cyanacetic acid esters with complex metal hydrides under conditions favoring reduction of the ester group. The starting materials are mostly highly viscous oils.

The compounds of the invention are capable of exerting a depressive effect on the central nervous system. They have prolonged muscle-relaxing and anti-spasmodic activity and are useful as tranquilizing agents and sedatives.

In comprison with some of the known compounds having similar activity, the compounds of the invention compare most favorably. Thus, for example, α-phenyl-α-cyano-butylurethane has a stronger sedative action than hydroxyphenamate and has a stronger muscle-relaxant activity than hydroxyphenamate and meprobamate. Another compound, α-p-chlorophenyl-α-cyano-butylurethane, is considerably superior to hydroxyphenamate in anti-spasmodic activity. It is approximately equivalent to sodium phenobarbital in sedative activity, although much greater doses are required to initiate narcotic activity, and is very much less taxic than phenobarbital and meprobamate.

Individual therapeutic dosages are preferably of the order of 100 to 200 mg. per os; daily therapeutic dosages are about 300 to 600 mg. per os. The compounds of the invention may be admixed and dispensed with suitable carrier materials well-known to those skilled in the art.

The following examples are included to illustrate the invention.

EXAMPLE 1

2-(4'-tolyl)-2-cyano-butylurethane 94.5 g. 2-ethyl-2-(4'-tolyl) - 3 - hydroxypropionitrile (M.P. 70–76° C.) are subjected to azeotropic distillation in a column with 111.5 g. ethylurethane, 25 g. aluminum isopropylate in 1 l. cyclohexane. The alcohol-cyclohexane azeotrope is removed from the head of the column and the cyclohexane is replaced continuously at the rate of withdrawal. When the re-esterification is complete, the contents of the column are evaporated to dryness, the residue is dissolved in 100 ml. isopropanol and, while stirring and cooling, added to 1 l. of 0.5 N hydrochloric acid. After some time, 2-(4'-tolyl)-2-cyano-butylurethane crystallizes in the form of fine needles, which are filtered off, dried, and recrystallized from benzene-ligroin. The yield is 82.1 g.; the melting point is 96–97.5° C.

The same procedure was followed in Examples 2 to 8 below. Any final product not obtained in crystalline form was purified chromatographically.

| Starting material | Final product | M.P., °C. |
|---|---|---|
| Example | | |
| 2 ......... 2-ethyl-2-(3'-tolyl)-3-hydroxypropionitrile ......... | 2-(3'tolyl)-2-cyano-butylurethane ......... | 82–83 |
| 3 ......... 2-ethyl-2-(3',4'-xylyl)-3-hydroxypropionitrile ......... | 2-(3',4'-xylyl)-2-cyano-butylurethane ......... | 119–121 |
| 4 ......... 2-ethyl-2-isopropyl-3-hydroxypropionitrile ......... | 2-isopropyl-2-cyano-butylurethane- ......... | 72.5–74 |
| 5 ......... 2-ethyl-2(1'-methylbutyl)-3-hydroxypropionitrile ......... | 2-(1'-methylbutyl)-2-cyano-butylurethane ......... | (¹) |
| 6 ......... 1-cyano-1-hydroxymethylcyclopentane ......... | 1-cyano-cyclopentyl methylurethane ......... | 57–60 |
| 7 ......... 2-ethyl-2-isoamyl-3-hydroxypropionitrile ......... | 2-isoamyl-2-cyano-butylurethane ......... | (¹) |
| 8 ......... 2-ethyl-2-sec. butyl-3-hydroxypropionitrile ......... | 2-sec. butyl-2-cyano-butylurethane ......... | (¹) |

¹ Viscous oil.

EXAMPLE 9

2-phenyl-2-cyano-butylurethane 16.5 g. chlorocarbonic acid phenyl ester are added dropwise, while stirring and cooling, to 17.5 g. 2-phenyl-2-ethyl-3-hydroxypropionitrile and 8.3 g. pyridine in 150 ml. benzene. The mixture is allowed to react for three hours at room temperature while stirring. The precipitate is then extracted with water, 2 N hydrochloric acid and bicarbonate solution and dried with sodium sulfate. A 0.3 mole ammonia-containing alcoholic ammonia solution is added dropwise at room temperature to the dried benzene solution and the mixture is allowed to stand for fifteen hours. After evaporation of the solvent mixture, the residue is again dissolved in benzene, shaken with 1 N sodium hydroxide, and washed with water. After evaporation of the benzene, 18 g. 2-phenyl-2-cyano-butylurethane having an M.P. of 76–78.5° C. (from benzene-ligroin) is obtained.

The same procedure was followed in Examples 10 to 21 below. Any final product not obtained in crystalline form was purified chromatographically.

I claim:

1. A compound of the formula

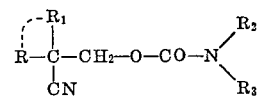

in which R is a straight or branched chain alkyl of 1 to 6 carbon atoms; $R_1$ is a straight or branched chain alkyl of 1 to 6 carbon atoms, phenyl, or phenyl mono- or di-substituted by chlorine, trifluoromethyl, nitro, alkyl of 1 to 3 carbon atoms or alkoxy of 1 to 3 carbon atoms; R and $R_1$ together are divalent alkylene of 3 to 5 carbon atoms; $R_2$ and $R_3$ are hydrogen, lower alkyl, lower alkoxy or benzyl.

2. A compound as defined in claim 1 wherein R is ethyl.

3. A compound as defined in claim 1 wherein $R_1$ is phenyl.

4. A compound as defined in claim 1 wherein $R_1$ is chlorophenyl.

| Example | Final product | M.P., °C |
|---|---|---|
| 10 ......... | 2-p-chlorophenyl-2-cyano-butylurethane ......... | 99–101 |
| 11 ......... | 2-o-chlorophenyl-2-cyano-butylurethane ......... | 92–94 |
| 12 ......... | 2-phenyl-2-cyano-isoamylurethane ......... | 80–81 |
| 13 ......... | 2-phenyl-2-cyano-isohexylurethane ......... | 76.5–78.5 |
| 14 ......... | 2-phenyl-2-cyano-(3'-methylamyl)-urethane ......... | (¹) |
| 15 ......... | 2-phenyl-2-cyano-n-hexylurethane ......... | (¹) |
| 16 ......... | 2-phenyl-2-cyano-propylurethane ......... | 77–79 |
| 17 ......... | 2-p-methoxyphenyl-2-cyano-butylurethane ......... | 75–77 |
| 18 ......... | 2-(3', 4'-dimethoxyphenyl)-2-cyanoisoamylurethane ......... | 136–138 |
| 19 ......... | 2-(3', 4'-dimethoxyphenyl)-2-cyanobutylurethane ......... | 117–118.5 |
| 20 ......... | 2-(m-trifluoromethylphenyl)2-cyanobutylurethane ......... | 65–66 |
| 21 ......... | 2-p-nitrophenyl-2-cyano-butylurethane ......... | 99–100 |

¹ Highly viscous oil.

A similar procedure was used in Examples 22 to 30, below, to obtain N-substituted urethanes by reaction of the corresponding 2,2-disubstituted 3-hydroxypropionitrile-carbonic acid phenyl esters with primary or secondary amines of Formula III.

5. A compound as defined in claim 1 wherein $R_2$ and $R_3$ are hydrogen.

6. 2-phenyl-2-cyano-butylurethane.

7. 2-p-chlorophenyl-2-cyano-butylurethane.

| Example | Final product | B.P. (mm./° C.) | M.P., °C |
|---|---|---|---|
| 22 ......... | N-butyl-2-phenyl-2-cyano butylurethane ......... | 0.01/160–180 | ......... |
| 23 ......... | N,N-dimethyl-2-phenyl-2-cyano-butylurethane ......... | 0.1/130–150 | ......... |
| 24 ......... | N-pentamethylene-2-phenyl-2-cyano-butylurethane ......... | 0.1/150–170 | ......... |
| 25 ......... | Morpholino-carbonic acid ester of 2-phenyl-2-cyano-butylalcohol ......... | 0.01/160–180 | ......... |
| 26 ......... | N-methyl-2-p-chlorophenyl-2-cyano-butylurethane ......... | | 69–71 |
| 27 ......... | N,N-dimethyl-2-p-chlorophenyl-2-cyano-butylurethane ......... | 0.01/100–180 | ......... |
| 28 ......... | N-isopropyl-2-p-chlorophenyl-2-cyano-butylurethane ......... | | 70–72 |
| 29 ......... | N-hydroxyethyl-2-p-chlorophenyl-2-cyano-butylurethane ......... | | 58–61 |
| 30 ......... | N-benzyl-2-p-chlorophenyl-2-cyano-butylurethane ......... | | 61–63 |

(References on following page)

References Cited

UNITED STATES PATENTS

| | | | |
|---|---|---|---|
| 3,102,132 | 8/1963 | Albertson | 260—465 |
| 3,206,491 | 9/1965 | Gubler et al. | 260—465.4 X |
| 3,222,392 | 12/1965 | Berger et al. | 260—482 |
| 3,265,727 | 8/1966 | Bossinger et al. | 260—482 |
| 3,310,555 | 3/1967 | Pesson | 260—465 X |
| 3,313,692 | 4/1967 | Bossinger et al. | 260—482 X |
| 3,313,700 | 4/1967 | Bossinger et al. | 260—482 X |
| 3,338,785 | 8/1967 | Bossinger et al. | 260—482 X |
| 3,374,265 | 3/1968 | Bossinger et al. | 260—482 |
| 3,400,153 | 9/1968 | Payne et al. | 260—465.4 X |

OTHER REFERENCES

Wagner et al., Synthetic Organic Chemistry, pp. 645–647 (1965).

Adams et al., Chemical Reviews, vol. 65, pp. 567–571 (1965).

CHARLES B. PARKER, Primary Examiner

S. T. LAWRENCE, III, Assistant Examiner

U.S. Cl. X.R.

260—247.2, 294.3, 464, 465.4, 465.6; 424—248, 267, 304